(12) United States Patent
Panek et al.

(10) Patent No.: US 8,922,803 B2
(45) Date of Patent: Dec. 30, 2014

(54) BITMAP ROTATION MECHANISM

(71) Applicants: Virgil-Alexandru Panek, Ghiroda (RO); John Thomas Varga, Longmont, CO (US)

(72) Inventors: Virgil-Alexandru Panek, Ghiroda (RO); John Thomas Varga, Longmont, CO (US)

(73) Assignee: Ricoh Company, Ltd., Tokyo (JP)

( * ) Notice: Subject to any disclaimer, the term of this patent is extended or adjusted under 35 U.S.C. 154(b) by 1 day.

(21) Appl. No.: 13/778,719

(22) Filed: Feb. 27, 2013

(65) Prior Publication Data
US 2014/0240783 A1    Aug. 28, 2014

(51) Int. Cl.
G06F 3/12      (2006.01)
G06K 15/00   (2006.01)
G06K 9/36    (2006.01)

(52) U.S. Cl.
CPC ....................................... *G06F 3/122* (2013.01)
USPC ......... 358/1.13; 358/1.17; 358/1.18; 382/276

(58) Field of Classification Search
CPC ............ G06T 1/20; G06T 3/602; G06T 3/606
See application file for complete search history.

(56) References Cited

U.S. PATENT DOCUMENTS

| 5,732,202 | A | 3/1998 | Okamoto |
| 5,751,865 | A | 5/1998 | Micco et al. |
| 6,442,302 | B2 | 8/2002 | Klassen |
| 6,470,098 | B2 | 10/2002 | Yamaguchi et al. |
| 7,019,864 | B2 | 3/2006 | Delhoune et al. |
| 7,512,287 | B2 * | 3/2009 | van Baarsen et al. ......... 382/296 |
| 7,535,474 | B1 * | 5/2009 | Scholander et al. .......... 345/531 |
| 2001/0017946 | A1 * | 8/2001 | Klassen ........................ 382/296 |
| 2002/0018238 | A1 | 2/2002 | Hirano |
| 2012/0206770 | A1 | 8/2012 | Marconi et al. |

* cited by examiner

*Primary Examiner* — Thomas Lett
(74) *Attorney, Agent, or Firm* — Blakely, Sokoloff, Taylor & Zafman LLP

(57) ABSTRACT

A method is disclosed. The method includes allocating a decompressor for each scanline of an input image represented as compressed bitmap data, allocating tiles to store bitmap data representing a rotation of the image and generating a rotated output image represented as compressed bitmap data.

14 Claims, 4 Drawing Sheets

BITMAP ROTATION MECHANISM

FIELD OF THE INVENTION

This invention relates generally to the field of printing systems. More particularly, the invention relates to image processing.

BACKGROUND

In a variety of document presentation systems such as printing systems, it is common to rasterize data to generate a bitmap representation of each sheetside image of the document by processing a sequence of data objects. The data objects are typically initially defined in a page description language or other suitable encoding and at some point prior to writing to a bitmap are represented as regions of rectangles of pixels. Typically, the sheetside image is then generated into a bitmap memory as a two dimensional matrix of pixels representing the intended document sheetside image.

Often these sheetside images are saved to enable reuse during printing of a job. Thus, when a job is saved at a fixed page size and subsequently used at that same size, the pages do not have to be re-rasterized. However, the pages may ultimately be printed on paper loaded in a different orientation (such as Long Edge Feed vs. Short Edge Feed), and thus need to be rotated to match the paper direction. Rotation of the saved bitmaps currently requires that the pages be completely decompressed, rotated and then recompressed. This process may take longer than actually processing the job a second time.

Accordingly, an efficient bitmap rotation mechanism is desired.

SUMMARY

In one embodiment, a method is disclosed. The method includes allocating a decompressor for each scanline of an input image represented as PackBits compressed data, allocating tiles to store bitmap data representing a rotation of the image and generating a rotated output image represented as PackBits compressed data.

BRIEF DESCRIPTION OF THE DRAWINGS

A better understanding of the present invention can be obtained from the following detailed description in conjunction with the following drawings, in which.

DETAILED DESCRIPTION

A bitmap rotation mechanism is described. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
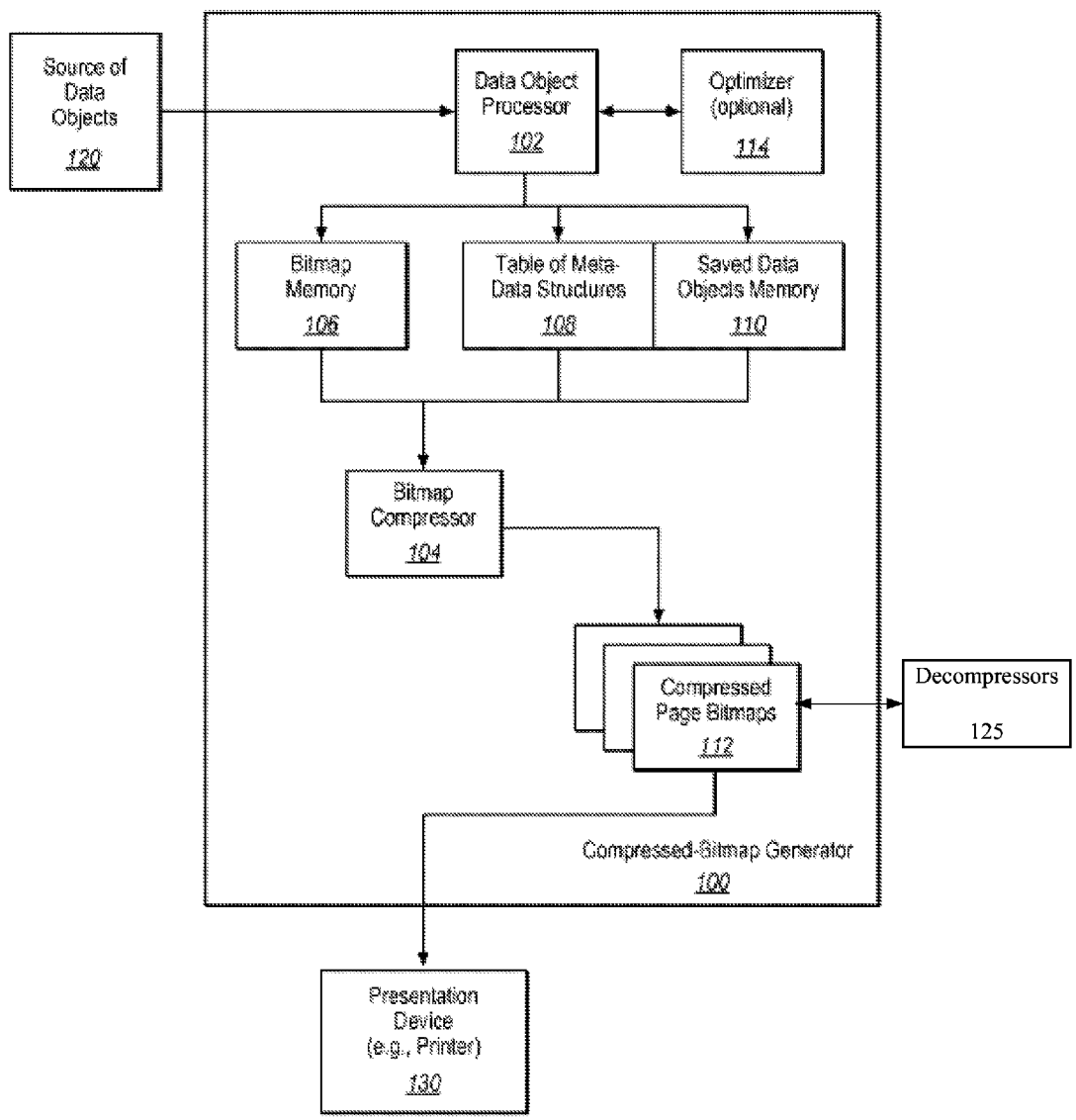
FIG. 1 is a block diagram illustrating one embodiment of a system that processes data objects to generate compressed bitmaps utilizing meta-data structures.

FIG. 1 is a block diagram of a system 100 for generating compressed bitmaps. A source of data objects 120 provides a sequence of data objects that represent a sheetside image. Data object processor 102 processes the sequence of data objects to generate a sheetside image represented in bitmap memory 106 and/or in a table of meta-data structures 108. Each sheetside image causes generation of a compressed page bitmap 112 by operation of the bitmap compressor 104.

Such a sequence of compressed page bitmaps 112 may represent a stored document or job to be transmitted to a presentation device 130. Presentation device 130 may be, for example, a printer and thus the sequence of compressed page bitmaps 112 may represent a print job or document to be printed by a printer.

Data object processor 102 processes the data objects representing information to be presented on a sheetside image. The data objects as received may be encoded in any of several well-known encoding standards such as page description languages and other document description standards. A data object may represent, for example, text or graphical information to be positioned within the sheetside image of the document. Thus, data object processor 102 is generally operable to process the data object by storing information derived from the data object in the bitmap memory 106 and/or in associated meta-data structures 108.

In one embodiment, data object processor 102 utilizes a table of meta-data structures 108 to reduce the need to write bitmap memory 106 for each data object and thus reduce utilization of memory bandwidth between data object processor 102 and bitmap memory 106. Reduced utilization of bitmap memory bandwidth improves efficiency of the generation of the corresponding compressed bitmaps by speeding the generation of the uncompressed sheetside image.

Specifically, data object processor 102 stores information relating to portions of bitmap memory 106 in corresponding entries of meta-data structure table 108. Processing of many data objects affecting portions of the bitmap memory 106 may be completed by simply updating information in corresponding entries of meta-data structure table 108. Other, or subsequent, data objects may require that the bitmap memory 106 be written in accordance with data represented by the data object.

Data object processor 102 therefore determines in processing each data object for the sheetside image whether portions of the data object must be written to portions of bitmap memory 106 or whether they may be compactly represented in corresponding meta-data structures within the table of meta-data structures 108 without requiring writing of portions of bitmap memory 106.

In one embodiment, a significant number of data objects may be represented by compact meta-data structures in table 108 and thus processor 102 may avoid the necessity of writing pixel by pixel information into bitmap memory 106. Some simple data objects such as those representing a solid color (e.g., a cleared bitmap or a solid color in a portion of the bitmap) may be represented in very compact form in meta-data structures of table 108 without requiring writing of any data in bitmap memory 106. Even more complex data objects such as a transparency masks or an opaque image may be represented compactly in a meta-data structure in table 108.

Processor 102 retains the received data objects in memory 110 and the meta-data structures may indirectly point to the saved data objects that are compactly represented thereby. Again with such a compact representation in the meta-data structure, data object processor 102 may reduce the volume of memory bandwidth utilization required to generate data objects.

Figure 2:
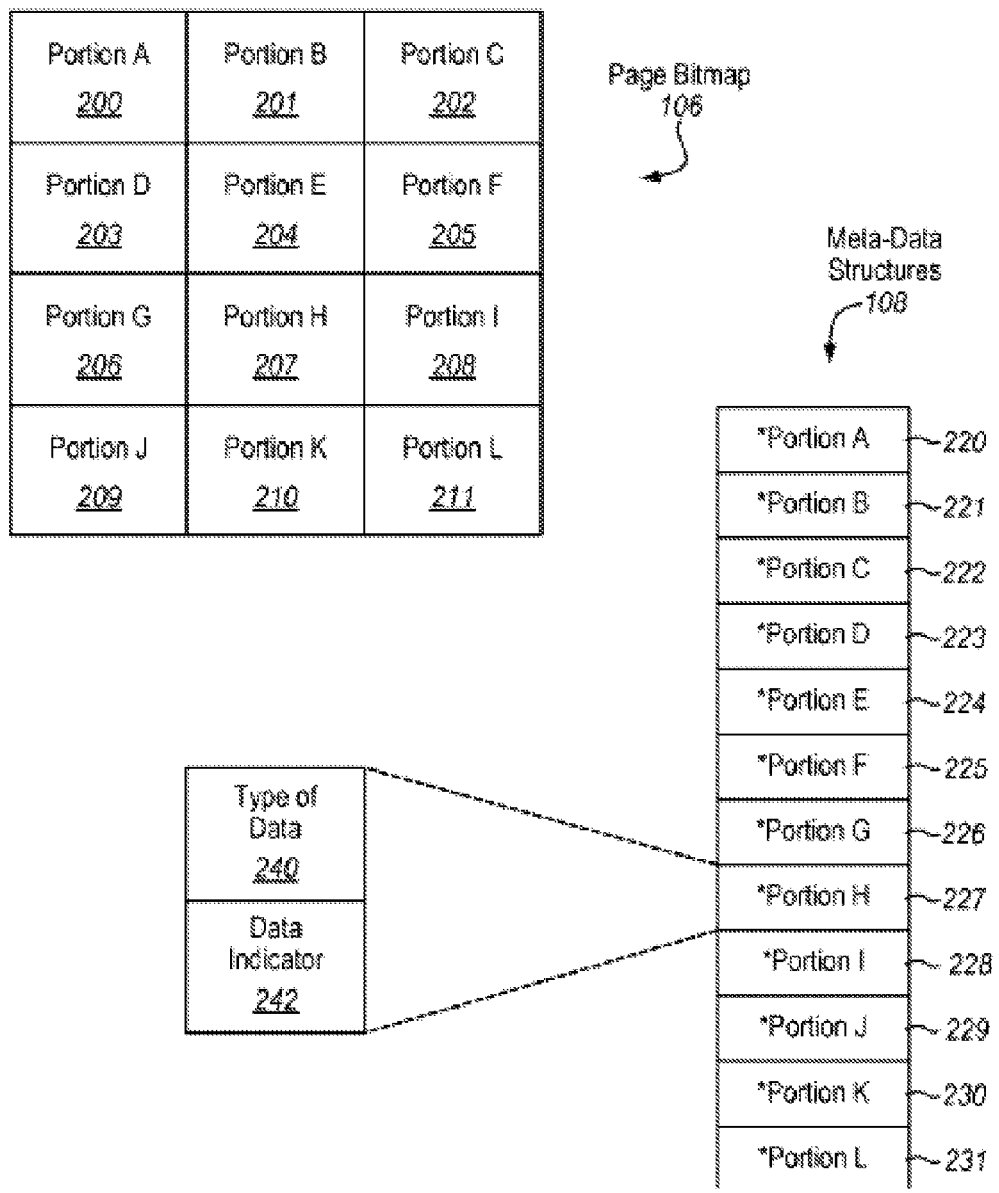
FIG. 2 is a block diagram illustrating one embodiment of a description of an association of each meta-data structure in a table of structures with a corresponding portion of the page bitmap memory.

FIG. 2 is a block diagram illustrating one embodiment of a relationship between a plurality of portions (or tiles) of a bitmap memory 106 and the table of meta-data structures 108. As shown in FIG. 2, bitmap memory 106 is logically subdivided into a plurality portions (or tiles) that may all be of equal size.

In one embodiment, bitmap 106 includes a plurality of identically sized, rectangular portions 200 through 211 ("Portion A" through "Portion L"). Each portion has a corresponding entry (220 through 231) in the table of meta-data structures 108. In particular, meta-data structure table 108 entry 220 ("*Portion A") includes information regarding the corresponding "Portion A" 200 of the bitmap memory 106. In like manner meta-data structure entry 221 ("*Portion B") corresponds to "Portion B" 201 of bitmap memory 106, etc.

Any suitable number of portions may be predefined in accordance with features and aspects hereof. Thus the number of such portions (200-211), the corresponding number of meta-data structures (221-231) in table 108, and the associated size of each of the portions may be predetermined and statically fixed within the system.

In one embodiment, each meta-data entry (220 through 231) includes a type of data field 240 and a data indicator field 242. The type of data field 240 indicates a type of data presently associated with the corresponding portion (200 through 211) of bitmap memory 106. Data indicator field 242 points (indirectly) at the saved data object that is presently associated with the portion corresponding to the meta-data structure. In a further embodiment, data indicator field 242 may directly encode the data of the data object presently associated with the portion.

Returning again to operation of data object processor 102 of FIG. 1, if the data derived from a data object were written to bitmap memory 106, the data may span one or more portions of the bitmap memory 106. As data object processor 102 processes data objects, for each portion of the bitmap memory 106 that would be affected by writing the data object, the corresponding meta-data structure in table 108 is updated to record information regarding the effect the data object would have on corresponding portions of the bitmap memory 106.

For example, if a data object would affect "Portion A" 200 and "Portion B" 201, data object processor 102 updates meta-data structures "*Portion A" 220 and "*Portion B" 221. Depending on the particular new data object and the current data compactly represented by the meta-data structure of a portion of the bitmap, updating the meta-data structures 220 and 221 may suffice to represent the new data object without needing to write data into the bitmap memory portions 200 and 201.

In one embodiment, the type of data field 240 of a meta-data structure entry may indicate that the corresponding portion of the bitmap memory is a "compact" type of data or a "non-compact" type of data. A data indicator field 242 represents the data of the corresponding portion in a compact form.

Most generally, if the data that would be in a portion of the bitmap memory may be compactly represented in the meta-data structure without requiring that the data be written to the corresponding portion of the bitmap memory, then the type of data for the affected meta-data structure is "compact" and the data indicator field represents the new data for the corresponding portion of the bitmap memory.

If the data that would be in a portion cannot be compactly represented in the meta-data structure, the type of data for the affected meta-data structure is "non-compact" and the data object/objects are simply written to the corresponding portion of the bitmap memory. Those of ordinary skill will recognize that these particular "type of data" values ("compact" and "non-compact") are intended mere as exemplary.

More specifically, a "compact" type of data indicates that the data of the corresponding portion of the bitmap is compactly represented by the information in the meta-data structure and hence is not written in the corresponding portion of the bitmap memory. For example, the bitmap memory at the start of processing of a sheetside image is logically cleared (e.g., a solid white background often represented as zeros in the bitmap memory).

As data objects are processed for the sheetside image, portions of the bitmap and corresponding meta-data structures may be affected by the processed data objects. A "compact" type of data in the meta-data structure for such an affected portion of the bitmap then indicates that some data object has been processed that has affected the corresponding portion of the bitmap and that the effect on the corresponding portion is represented compactly in the meta-data structure by the data indicator field.

For example, the data indicator field may indirectly point to the data object in the saved data object memory. In another example, the data indicator field may directly represent that data object by an encoded value (such as the color of a rectangular data object that affects the corresponding portion of the bitmap memory). Hence, the portion of the bitmap memory corresponding to a meta-data structure having the "compact" data type has no relevant information written therein thus reducing bitmap memory bandwidth utilization that would be required to write the data objects to the bitmap memory.

A "non-compact" type of data indicates that the data of the corresponding portion of the bitmap cannot be compactly represented in a meta-data structure alone for any of various reasons (i.e., cannot be adequately represented by the data indicator field). In such a case, the data object or objects that affect the corresponding portion of the bitmap memory are simply written to the bitmap memory.

Numerous conditions may arise to preclude a "compact" type of data representation for a portion of the bitmap. Other conditions may arise where, as a matter of design choice, the portion could be represented by either a "compact" type of data or by a "non-compact" type of data in the corresponding meta-data structure. Based on cost/benefit implementation details for a particular application it may be determined that a "compact" representation is not desired.

For example, added computational complexity to compactly represent combinations of data objects overlapping within a portion may be too high although the particular overlapping data could be represented compactly. In another example, if image objects are a rarity in a particular application, there may be little benefit in compactly representing image data objects in a "compact" type of data meta-data structure.

In yet another example, where image objects are frequent and often overlapping in portions of the bitmap memory (e.g., a photo montage), significant benefits may be realized in assuring that portions with such overlapping image objects are compactly represented whenever possible to avoid using bitmap memory bandwidth to write image data that is likely to be overwritten by a later image data object. These and other heuristics and design choices will be readily apparent enhancements to the features and aspects hereof to optimize the systems and methods for particular applications.

In one embodiment, an effect a data object may have on one or more portions of the bitmap that it overlays depends on the particular semantic of the data object. Any of a variety of data objects may be encountered depending upon design choices in implementation of features and aspects hereof. In general all objects may be considered as a collection of pixels—each pixel having some value indicating a color and/or indicating a transparency value.

In general, all objects are represented as a 2-dimensional array of such pixel values (e.g., a rectangular bounding box of pixel values). The value of a pixel may be encoded in a number of manners. For example, full color data objects may be defined as a pixel intensity value for each of three primary color planes and the color black. In another example, each pixel may simply encode an index value into a table of pre-defined colors (e.g., a palette). Further, each pixel value may encode a transparency level indicating that the pixel is transparent (i.e., has no color—no effect on the bitmap) or has some opaque color value (with the color specified by the value as indicated above).

Features and aspects hereof may be used with any and all such data object encodings and shapes. In one embodiment, data objects may be classified in one of four broad categories: rectangle, transparency mask, palette, and opaque image.

A "rectangle" is any data object that represents a rectangular area where the pixels of the rectangular area each represent a specified opaque color. Thus, a rectangle object is typically defined by its geometric dimensions and a single color value. A rectangle may thus be compactly represented in a portion of the bitmap by a corresponding meta-data structure as a "compact" type of data where the data indicator field either points to the saved data object or encodes the dimensions and color of the rectangle.

A "transparency mask" is any data object (typically also rectangular in shape though not necessarily) where each pixel of the mask is either a "transparent" bit or an "opaque" bit of some specified color. This kind of data object is also sometimes referred to as a "bi-level image". Text is often represented as such a transparency mask. The glyph representing a character code or a sequence of such glyphs are represented as opaque pixels (all of the same color) against a bounding box background of transparent bits that do not affect the bitmap memory. When writing such a transparency mask to bitmap memory, the opaque pixels are written to the bitmap memory and the transparent pixels have no effect such that whatever was previously in the corresponding pixel locations of the bitmap memory remains unchanged. Typically the transparency mask is defined as a rectangular area with the transparent and opaque pixels defined therein. A transparency mask may thus be compactly represented in a portion of the bitmap by a corresponding meta-data structure as a "compact" type of data where the data indicator field points to the saved data object.

A "palette" is any data object that defines a shape (often a rectangular area) filled with one or more colors where the colors are selected from a limited set of colors (a palette). Thus, the colors are specified as index values in the relatively small range of palette values. In one embodiment of such a palette object, one palette color index value is reserved to represent a "transparent pixel" and all other palette color index values represent other corresponding colors in the palette. A palette data object may thus be compactly represented in a portion of the bitmap by a corresponding meta-data structure as a "compact" type of data where the data indicator field points to the saved data object.

An "opaque image" data object is any object where each pixel is opaque and has a pixel value in a color spectrum. Photographic images are exemplary of such an opaque image object. An opaque image is typically defined as a rectangular area of such opaque pixel values. An opaque image may thus be compactly represented in a portion of the bitmap by a corresponding meta-data structure as a "compact" type of data where the data indicator field points to the saved data object. Further, the pixels of an opaque image object may be compressed and encoded according to a number of well known standards such as LZW and JPEG standards.

When data objects of these exemplary types are associated with portions by means of positioning the data object on a sheetside, the data object can be represented by a series of portions aligned with the portions of the underlying sheetside. Some affected portions of the bitmap memory are completely filled and some are only partially filled depending on the position of the data object on the sheetside. For example, a rectangle data object may include portions only partially affected by the data object at a boundary of the rectangle (i.e., showing the edges of the rectangle) and solid portions (i.e., the center areas, completely filled by the rectangle). Similarly, other types of objects (e.g., opaque image data objects, transparency mask data objects, and palette data objects) may affect portions of the bitmap differently where the object completely fills a portion versus portions that are only partially affected by the data object at a boundary edge of the object. As noted above, such portions that are only partially affected by processing of a data object may nonetheless be compactly represented by the meta-data structure for that portion.

As data objects are processed to update meta-data structures corresponding to affected portions of the bitmap memory, combinations of data objects of the above types may be processed within any single affected portion (e.g., a sequence of objects may each affect a common portion each object overwriting or in some way adding to the pixels of the portion).

In one embodiment, the specific effect on a portion of the bitmap from processing a data object depends, in part, on the present type of data associated with the portion as indicated in the corresponding meta-data structure. In general, if an affected portion presently indicates a "compact" type of data in its corresponding meta-data structure, a next data object processed that completely fills the portion will typically retain the "compact" type of data but update the data indicator to represent the new object.

If the new object only partially covers the portion that is currently compactly represented by a corresponding meta-data structure, then the type of data may be changed to "non-compact" to represent the mixture of the effects of the prior data object mixed with the partial effect of the new data object.

If a "transparency mask" object is processed, its effect on any portion currently represented by a "compact" type of data meta-structure may depend on what the prior data object was. As can be seen from the above few examples, a variety of objects and combinations of objects may be represented compactly in the meta-data structure for an affected portion while other combinations of objects affecting a portion may require non-compact representation by writing to the bitmap memory portion.

According to one embodiment, an optional optimizer element 114 may be operable in system 100 to analyze the efficiency of the number and size of the portions for a particular set of data objects. Based upon such analysis, optimizer 114 may adjust the size and number of such portions and correspondingly adjust the number of meta-data structures in table 108. For certain types of documents or jobs, fewer such portions of larger size may provide optimal results in processing sheetside images.

In other types of documents or jobs, a larger number of smaller portions may provide optimal sheetside image processing. Where the portions are all of equal shape and size, the association between a meta-data structure (220 through 231) and its corresponding portion (200 through 211) of the bitmap memory 106 may be determined by a simple indexing calculation to associate the meta-data structure by its index position within the table 108 with its corresponding bitmap memory portion. Where the number, size, and/or shape of the bitmap portions are variable, each meta-data structure (220 through 231) may include suitable addressing information to identify its corresponding portion (200 through 211) of the bitmap memory.

Compressed-bitmap generator 100 also includes bitmap compressor 104 to generate compressed data representing a compressed page bitmap 112 following completion of the generation of a sheetside image by data object processor 102. When data object processor 102 has completed processing of a sequence of data objects representing a particular sheetside image, bitmap compressor 104 is operable to retrieve each meta-data structure and to generate compressed data in a compressed page bitmap 112 based on the information stored in the meta-data structure.

Where a meta-data structure provides sufficient information to generate a compressed representation of the corresponding portion of bitmap data, bitmap compressor 104 need not read bitmap memory 106 to generate a portion of the compressed page bitmap 112. Where the meta-data structure indicates that the corresponding portion of the bitmap contains the data to be compressed, bitmap compressor 104 reads the indicated portion of bitmap memory 106 to generate the corresponding portions of compressed page bitmaps 112.

According to one embodiment, bitmap compressor 104 generates a compressed representation of a sheetside image using the meta-data structures. In such an embodiment, the compressed data may be generated by stepping through each horizontal line across the bitmap memory (e.g., each scanline) and generating compressed data from the meta-data structures that intersect each scanline.

In a further embodiment, compressed data is generated according to a PackBits compression scheme (e.g., PackBits) for run-length encoding of the bitmap data. PackBits compresses raw data by looking for repeated strings having the same 8-bit value. A control byte is used to indicate repeat (negative values) or pass-thru (positive values) data. The absolute value of the control byte is the number of repeated or passed-thru values decremented by 1.

For instance, values 0 thru 127 indicate that 1 thru 128 passed-thru values will follow the control byte, while values −1 thru −127 indicate that the following value is repeated for a total of 2 thru 128 times. The value −128 is not defined, and thus may be used in non-standard ways. In one embodiment, 3 or more identical 8-bit data values are coded as a repeat sequence (e.g., 0 0 0 raw 8-bit data is coded as −2 0). Further, a string of non-identical data values is coded as a pass-thru (or literal) string (e.g., 21 22 23 24 raw data is coded as 3 21 22 23 24).

After a sheetside is compressed, the bitmap data is later processed for printing. Specifically, the data may be retrieved, decompressed and processed for printing. For instance, processing may involve converting the bitmap to a size commensurate with a printing bitmap. Also, additional bitmaps (e.g., N-up) or other data ((e.g., header/footer, watermark, etc.) need to be added and/or overlaid.

As discussed above, sheetside images may need to be rotated to match paper direction for which current systems require complete decompression of compressed PackBits data to facilitate. According to one embodiment, de-compressors 125 are implemented to perform sheetside rotations without complete decompression of the data. In such an embodiment, one decompressor is provided per each scanline of the original sheetside image.

In an alternative embodiment, a single decompressor 125 may be used for this task if capable of efficiently decompressing a run of pels (say 64) from scanline n−1, then a run of pels from scanline n−2 . . . etc. down to scanline 0, then continue with next 64 pels from scanline n−1, n−2 . . . 0 etc.

In such an embodiment, the PackBits data for a sheetside is processed for scanlines for which a PackBits set of scanlines is assembled to decompress the data. In a further embodiment, a decompressor 125 is applied per output tile (e.g., 64 by 64 pixels) in order to extract the data from the input image. In such an embodiment, the data indicates that the next run of pels on a corresponding scanline is a SOLID run (e.g., all pels with the same value) or a MIXED run (e.g., different pel value that should be decompressed, transposed and recompressed). Thus, information for repeated runs is provided by scanline decompressors 125 to prevent the runs from being decompressed into memory.

Figure 3:
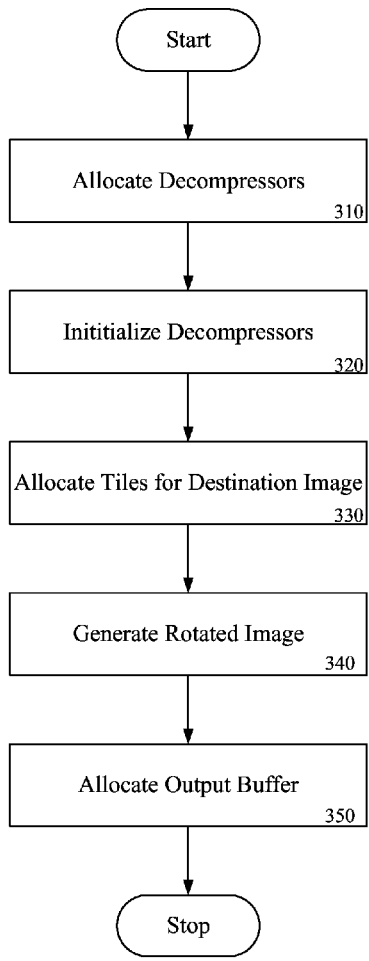
FIG. 3 is a flow diagram illustrating one embodiment of a rotation process.

FIG. 3 is a flow diagram illustrating one embodiment of a PackBits rotation process. At processing block 310, a decompressor 125 is allocated for each input scanline. At processing block 320, the decompressors 125 are initialized with the scanline addresses. In one embodiment, a bottom to top initialization (e.g. inverse order) is implemented to obtain a 90° rotation. However in other embodiments, a top to bottom initialization may be implemented. Subsequently, a single scanning pass is performed through the input image in which decompressors are initialized in the (out_height−1) to first (0) index order. This pass also loads much of the input image into the CPU cache.

At processing block 330, a single row of logical tiles for the destination image are allocated to store the rotated bitmap data, where the destination width equals the source height and the destination height equals the source width. These tiles temporarily hold information about a stripe/band of the output image. The row of tiles can be conceived of by imagining the tiles as gliding over the output image from top to bottom, and the tiles as horizontal divisions of the current band). In one embodiment, the tiles are similar to above-described tiles and have three states: initial, solid and mixed. In a further embodiment, sufficient memory is also allocated temporarily to maintain an uncompressed band of the output image. Once the tiles become mixed, the content will be written into a corresponding portion of this temporary band memory. The tiles and band memory may be reused for all output bands (e.g., no other allocations/deallocations).

Figure 4:
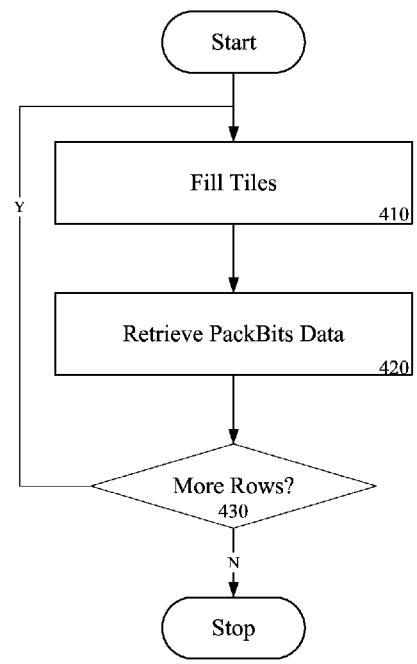
FIG. 4 is a flow diagram illustrating one embodiment of a process for producing an output image.

At processing block 340, a rotated output image is produced. In one embodiment, the rotated output image is first produced in bands (e.g., rows of tiles), which are subsequently loaded up and rotated from the input image and later compressed. In one embodiment, a limited amount of memory is used with utilization of CPU caches. Thus, a segmented (e.g., fixed-sized) list of buffers is used as the data structure holding the rotated PackBits in order to avoid allocating huge amounts of memory. The size of the fixed buffers depends on the width of the output scanline FIG. 4 is a flow diagram illustrating one embodiment of a process for producing the rotated output image. At processing block 410, each tile on a band is filled in from the input image. In one embodiment, this process is performed tile by tile (left to right), with each tile filling its columns left to right.

In such an embodiment, the columns will be filled by extracting a logical run corresponding to a minimum run length between one of the current concrete PackBits runs and the tile's remaining vertical extent (e.g., the height of the tile). In a further embodiment, the first repeated run will set the output tile's type to SOLID of the given color. Otherwise, the tile's type will be set to mixed if literal runs or repeated runs are of another color. This keeps the solid parts of the input image (e.g., matching the tile matrix) from being rasterized.

At processing block 420, the PackBits compressed data is retrieved from all the row's tiles. This process goes through all the output scanlines corresponding to the current row of tiles and generates the corresponding PackBits, which are written directly into the segmented list structure, appending to the previous rows output.

A list of segments is compiled in order to reduce the number of runtime tests and to merge multiple similar tiles. In one embodiment, a preprocessing pass is performed over the tiles that will generate a list of segments applicable to all the scanlines in this row of tiles. Segments have a length in pel and either a corresponding solid color or an offset to the beginning of the output scanline (e.g., in the temporary band memory) where their uncompressed mixed data resides.

Subsequently, all of the scanlines are run through by using the above-described segments list. Thus for each scanline, the process goes through the segments list and generates PackBits repeated runs for the solid color segments and compress the data for the mixed runs. At decision block 430, a determination is made as to whether additional bands (or rows of tiles) in the output image are available for processing. If so, control is returned to processing block 410. Otherwise, the output buffer at the needed size is allocated and the content is copied at processing block 350 FIG. 3.

Figure 5:
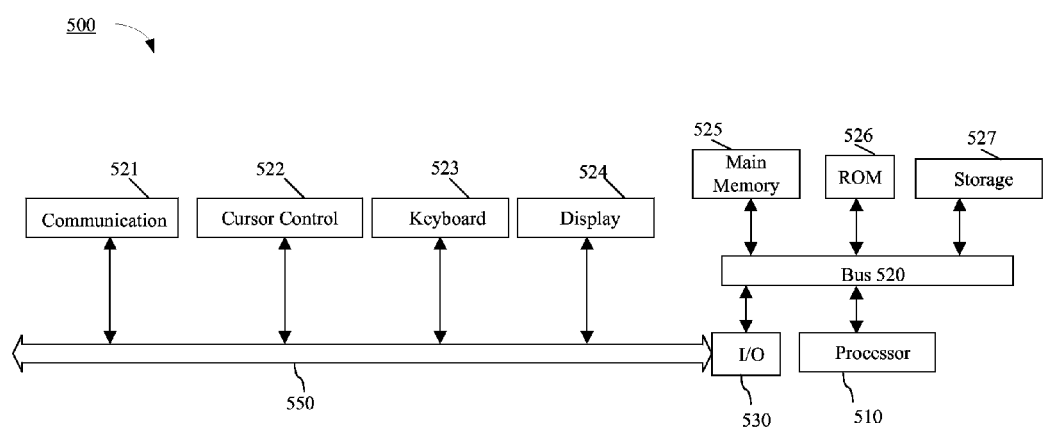
FIG. 5 illustrates one embodiment of a computer system.

FIG. 5 illustrates a computer system 500 on which compressed bitmap generator 100 and/or decompressors 125 may be implemented. Computer system 500 includes a system bus 520 for communicating information, and a processor 510 coupled to bus 520 for processing information.

Computer system 500 further comprises a random access memory (RAM) or other dynamic storage device 525 (referred to herein as main memory), coupled to bus 520 for storing information and instructions to be executed by processor 510. Main memory 525 also may be used for storing temporary variables or other intermediate information during execution of instructions by processor 510. Computer system 500 also may include a read only memory (ROM) and or other static storage device 526 coupled to bus 520 for storing static information and instructions used by processor 510.

A data storage device 525 such as a magnetic disk or optical disc and its corresponding drive may also be coupled to computer system 500 for storing information and instructions. Computer system 500 can also be coupled to a second I/O bus 550 via an I/O interface 530. A plurality of I/O devices may be coupled to I/O bus 550, including a display device 524, an input device (e.g., an alphanumeric input device 523 and or a cursor control device 522). The communication device 521 is for accessing other computers (servers or clients). The communication device 521 may comprise a modem, a network interface card, or other well-known interface device, such as those used for coupling to Ethernet, token ring, or other types of networks.

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Throughout the foregoing description, for the purposes of explanation, numerous specific details were set forth in order to provide a thorough understanding of the invention. It will be apparent, however, to one skilled in the art that the invention may be practiced without some of these specific details. Accordingly, the scope and spirit of the invention should be judged in terms of the claims which follow.

What is claimed is:

1. An article of manufacture comprising a computer-readable medium including instructions, which when executed by a processor, performs:
    allocating a decompressor for each scanline of an input image represented as compressed bitmap data;
    allocating memory tiles to store bitmap data representing a rotation of the image; and
    generating a rotated output image represented as compressed bitmap data by:
        filling each tile pel column with data from the input image by extracting a logical run corresponding to a minimum run length between a current run and a remaining vertical extent; and
        retrieving compressed bitmap data for each tile in a row to generate corresponding data by:
            compiling a list of segments to merge similar tiles; and
            processing using the list of segments to produce the rotated out image.

2. The article of manufacture of claim 1 wherein a first repeated run sets an output tile type to solid of a color and a literal run or repeated run of another color sets the output tile type to a mixed data.

3. The article of manufacture of claim 2 wherein each segment in the list of segments includes a length in pel and a corresponding solid color or an offset to the beginning of an output scanline storing uncompressed mixed data.

4. The article of manufacture of claim 3 wherein processing using the list of segments comprises:
    generating repeated runs for solid color segments for each segment; and
    compressing data for mixed runs.

5. The article of manufacture of claim 4 comprising a computer-readable medium including instructions, which when executed by the processor, further performs:
   allocating an output buffer; and
   copying the rotated output image to the output buffer.

6. The article of manufacture of claim 1 comprising a computer-readable medium including instructions, which when executed by the processor, further performs initializing each decompressor with scanline addresses prior to allocating the tiles.

7. A system comprising a processor to allocate a decompressor for each scanline of an input image represented as compressed bitmap data, allocate tiles to store bitmap data representing a rotation of the image and by filling each tile pel column with data from the input image by extracting a logical run corresponding to a minimum run length between a current run and a remaining vertical extent and retrieving compressed bitmap data for each tile in a row to generate corresponding data by compiling a list of segments to merge similar tiles and processing using the list of segments to produce the rotated out image.

8. The system of claim 7 wherein a first repeated run sets an output tile type to solid of a color and a literal run or repeated run of another color sets the output tile type to mixed data.

9. The system of claim 8 wherein each segment in the list of segments includes a length in pel and a corresponding solid color or an offset to the beginning of an output scanline storing uncompressed mixed data.

10. The system of claim 9 wherein processing using the list of segments comprises generating repeated runs for solid color segments for each segment and compressing data for mixed runs.

11. The system of claim 10 wherein the processor further allocates an output buffer and copies the rotated output image to the output buffer.

12. The system of claim 7 wherein the processor initializes each decompressor with scanline addresses prior to allocating the tiles.

13. A computer generated method comprising:
   allocating a decompressor for each scanline of an input image represented as compressed bitmap data;
   allocating tiles to store bitmap data representing a rotation of the image; and
   generating a rotated output image represented as compressed bitmap data by:
      filling each tile pel column with data from the input image by extracting a logical run corresponding to a minimum run length between a current run and a remaining vertical extent; and
      retrieving compressed bitmap data for each tile in a row to generate corresponding data by:
         compiling a list of segments to merge similar tiles; and
         processing using the list of segments to produce the rotated out image.

14. The method of claim 13 wherein a first repeated run sets an output tile type to solid of a color and a literal run or repeated run of another color sets the output tile type to a mixed data.

* * * * *